(12) United States Patent
Frank et al.

(10) Patent No.: US 12,741,520 B2
(45) Date of Patent: Sep. 22, 2026

(54) COVER SYSTEMS

(71) Applicant: Rivian IP Holdings, LLC, Irvine, CA (US)

(72) Inventors: Randall R. Frank, Northville, MI (US); Daniel Patrick Moll, Yorba Linda, CA (US); Greg Witten, Charlbury (GB); Michael Jocz, Novi, MI (US); Amir Mohammadi Nasab, Irvine, CA (US); Bhushan Nagarajan, Tustin, CA (US); Shakshi Himmatramka, Irvine, CA (US); Molly Hurley, Irvine, CA (US); Saxon Aden, Irvine, CA (US)

(73) Assignee: Rivian IP Holdings, LLC, Irvine, CA (US)

( * ) Notice: Subject to any disclaimer, the term of this patent is extended or adjusted under 35 U.S.C. 154(b) by 340 days.

(21) Appl. No.: 18/511,924

(22) Filed: Nov. 16, 2023

(65) Prior Publication Data

US 2024/0166036 A1 May 23, 2024

Related U.S. Application Data

(60) Provisional application No. 63/426,705, filed on Nov. 18, 2022.

(51) Int. Cl.

| | |
|---|---|
| ***B60J 10/84*** | (2016.01) |
| ***B60J 7/04*** | (2006.01) |
| ***B60J 10/27*** | (2016.01) |
| ***B62D 33/04*** | (2006.01) |

(52) U.S. Cl.

CPC ............... *B60J 10/84* (2016.02); *B60J 7/041* (2013.01); *B60J 10/27* (2016.02); *B62D 33/04* (2013.01)

(58) Field of Classification Search

CPC . B60J 7/041; B60J 10/27; B60J 10/84; B62D 33/0222; B62D 33/0273; B62D 33/04

See application file for complete search history.

(56) References Cited

U.S. PATENT DOCUMENTS

| | | | | |
|---|---|---|---|---|
| 2,239,062 A * | 4/1941 | Tallmadge ............ | A47C 31/04 5/255 |
| 3,649,072 A | 3/1972 | Cross | |
| 4,776,629 A | 10/1988 | Cross | |
| 4,930,561 A | 6/1990 | Clay | |
| 4,984,843 A | 1/1991 | Villa | |
| 6,270,154 B1 | 8/2001 | Farber | |
| 6,533,343 B2 | 3/2003 | Bohm | |
| 8,262,148 B2 | 9/2012 | Rusher | |

(Continued)

FOREIGN PATENT DOCUMENTS

| | | |
|---|---|---|
| DE | 3824793 A1 | 1/1990 |
| EP | 1676973 A1 | 7/2006 |

*Primary Examiner* — Lori Lyjak

(74) *Attorney, Agent, or Firm* — BakerHostetler

(57) ABSTRACT

Aspects of the subject disclosure relate to tonneau covers include spring assemblies that facilitate loading and unloading of panels linearly and with high stability. Such spring assemblies and other features of follower assemblies can provide smooth deployment and retraction of the tonneau cover. A tonneau cover can include individual panels that interlock with each other upon deployment and disconnect from each other upon retraction to controllably cover a truck bed or other region of a vehicle, such as a truck.

20 Claims, 11 Drawing Sheets

(56) References Cited

U.S. PATENT DOCUMENTS

| | | | |
|---|---|---|---|
| 8,979,182 | B2 | 3/2015 | Fukami |
| 9,415,670 | B2 | 8/2016 | Masumoto |
| 10,406,896 | B2 | 9/2019 | Ford |
| 10,525,804 | B2 | 1/2020 | Pompli et al. |
| 10,603,993 | B2 | 3/2020 | Ford |
| 11,091,013 | B2 | 8/2021 | Pompli et al. |
| 11,142,050 | B2 | 10/2021 | Pompili |
| 11,318,826 | B2 * | 5/2022 | Pompili ................. B60J 7/1607 |
| 11,453,281 | B2 | 9/2022 | Voetmann |
| 11,884,145 | B2 | 1/2024 | Pompili |
| 12,083,875 | B2 | 9/2024 | Pattabhiraman |
| 12,246,584 | B1 | 3/2025 | Ying |
| 12,296,789 | B2 | 5/2025 | Benoit |
| 12,330,487 | B2 | 6/2025 | Schmeichel |
| 12,403,752 | B2 | 9/2025 | Hammoud |
| 2022/0048435 | A1 | 2/2022 | Salewski |
| 2022/0258580 | A1 * | 8/2022 | Pompili .................... B60P 7/02 |
| 2024/0375499 | A1 | 11/2024 | Brown |

* cited by examiner 110
122
130A
174
112
126
170
124
128
130
120
180

200
202
206
204
216
214
212
208

COVER SYSTEMS

CROSS-REFERENCE TO RELATED APPLICATION

This application claims the benefit of U.S. Provisional Application No. 63/426,705, entitled "TONNEAU COVER," filed Nov. 18, 2022, the entirety of which is incorporated herein by reference.

INTRODUCTION

The present description relates generally to vehicles, including, for example, cover systems for vehicles.

Tonneau covers may generally include systems that may provide shelter and protection of cargo that may be stored within the cargo area of certain adventure vehicles, such as pickup trucks. As it may be appreciated, drivers or owners of such adventure vehicles may often utilize their vehicles, for example, for camping, off-roading, or other similar recreational outdoors activities. It may be thus useful to provide a tonneau cover that may be adaptable for multiple purposes.

SUMMARY

The present disclosure generally relates to a cover system that includes spring assemblies that facilitate loading and unloading of panels linearly and with high stability. Such spring assemblies and other features of follower assemblies can provide smooth deployment and retraction of the tonneau cover. A tonneau cover can include individual panels that interlock with each other upon deployment and disconnect from each other upon retraction to controllably cover a truck bed or other region of a vehicle, such as a truck.

In some embodiments, a cover system can include one or more spring assemblies. Each spring assembly can include multiple spring elements overlapping each other and configured to apply, to a stack of panels within a cartridge, a first force on a first side of the panels and a second force on a second side, opposite the first side, of the panels, the second force being greater than the first force. Each of the multiple spring elements can extend from an engagement end of the spring assembly that is configured to be coupled to a follower for supporting the panels within the cartridge. The spring assemblies can further include a sliding end for sliding along a support plate and defining a first curve protruding in a first direction, wherein the multiple spring elements each define a second curve protruding in a second direction, opposite the first direction.

In some embodiments, a follower assembly for a vehicle tonneau cover can include a follower including arms for supporting panels; and a spring assembly including: an engagement end coupled to the follower; a body forming a curve; and a sliding end, wherein the spring assembly is configured to bend at the engagement end as the follower urges the sliding end to slide along a support plate and until the curve of the body extends between the arms of the follower to directly engage the panels. The sliding end can define a first curve protruding in a first direction, and the body can define a second curve protruding in a second direction, opposite the first direction. The curve can be a first curve protruding towards the follower and the body can further include a second curve protruding towards the follower.

In some embodiments, a follower assembly for a vehicle tonneau cover can include a follower including arms extending in a first direction; and a spring assembly including: an engagement end; and a body forming curves; and a mount coupling the engagement end of the spring assembly to the follower such that the body extends from the engagement end in a second direction, the second direction being is transverse to the first direction and towards the follower. The body of the spring assembly can curve away from the second direction and away from the follower as it extends away from the mount. The body can include a first body portion defining a first curve protruding towards the follower and a second body portion defining a second curve protruding towards the follower.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

Figure 1A:
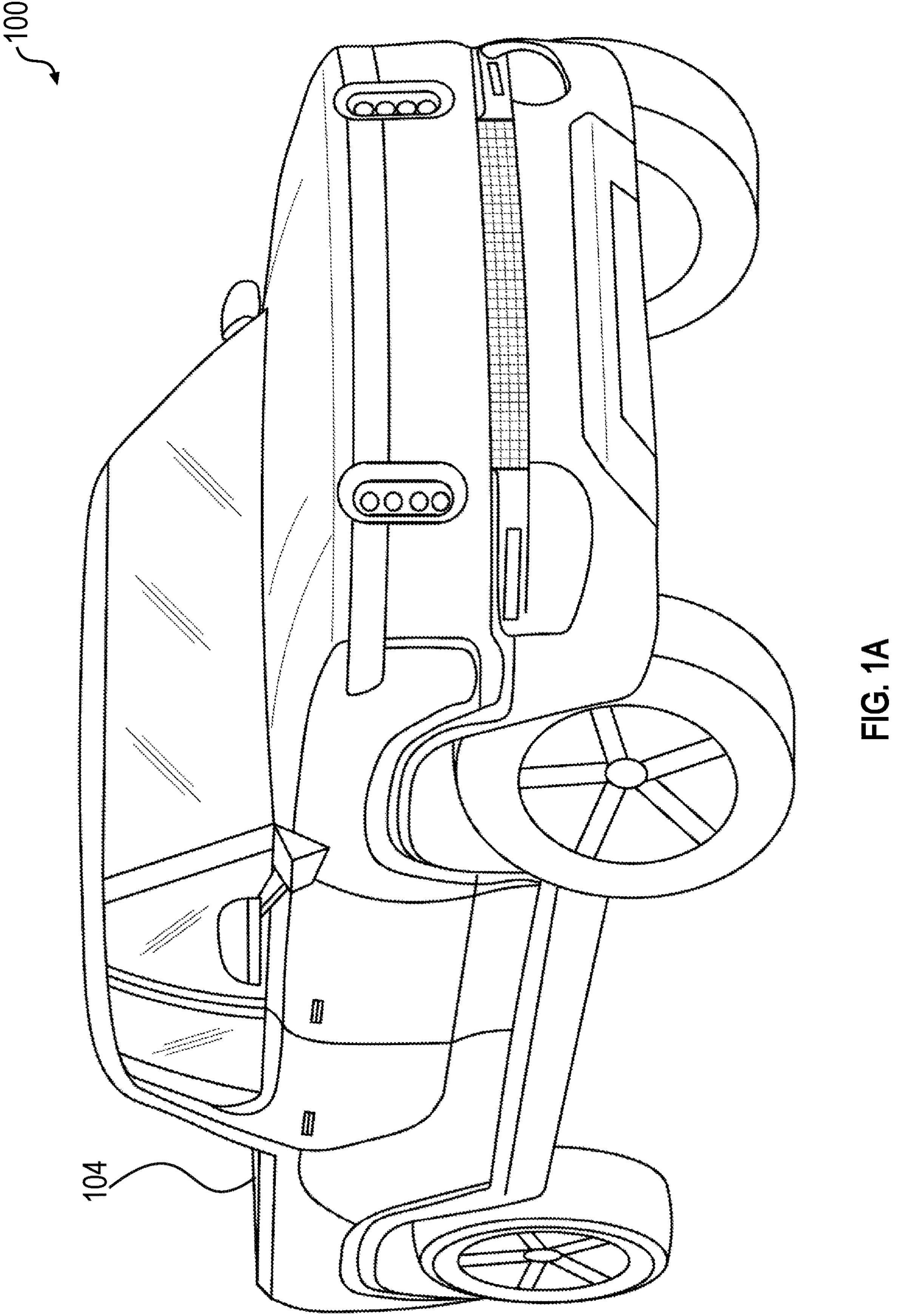
FIG. 1A illustrates a perspective view of a vehicle a cargo area, in accordance with implementations of the subject technology.

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, the subject technology is not limited to the specific details set forth herein and can be practiced using one or more other implementations. In one or more implementations, structures and components are shown in block diagram form in order to avoid obscuring the concepts of the subject technology.

Embodiments of the present disclosure are directed toward a multi-purpose cover (e.g., tonneau cover) for an adventure vehicle, such as a pickup truck, a crossover utility vehicle (CUV), or a sport utility vehicle (SUV). In some embodiments, the multi-purpose cover may be adaptably disposed onto the vehicle in each of a deployed configuration and a retracted configuration. For example, in some embodiments, in the deployed configuration, the multi-purpose cover may overlap a cargo area of the vehicle. In some embodiments, the multi-purpose cover may be attached to a perimeter of the cargo area via an attachment mechanism. In some embodiments, a motion control mechanism may be utilized to cause the multi-purpose cover to extend in a first direction so as to cover the cargo area and to retract in a second direction so as to uncover the cargo area.

In this way, the multi-purpose cover may adaptably operate in the deployed configuration as a tonneau cover to extend and protect the cargo area of the vehicle and the driver or owner's cargo from environmental elements (e.g., precipitation, sunlight, wind, debris, and so forth). The multi-purpose cover may also operate in the retracted configuration in a storage region and away from the cargo area. A tonneau cover can be operated with powered deployment and retraction capabilities. It can be desirable to perform such operations with minimal noise. Additionally, it can be desirable to provide the tonneau cover with individual components (e.g., panels) that can connect and disconnect from each other in a manner that avoids binding or jamming.

Implementations of the subject technology described herein provide tonneau covers that include spring assemblies that facilitate loading and unloading of panels linearly and with high stability. Such spring assemblies and other features of follower assemblies can provide smooth deployment and retraction of the tonneau cover. A tonneau cover can include individual panels that interlock with each other upon deployment and disconnect from each other upon retraction to controllably cover a truck bed or other region of a vehicle, such as a truck. Tonneau covers described herein can perform such operations with minimal noise generation.

FIG. 1A illustrates an example embodiment of a vehicle 100, in accordance with the presently disclosed embodiments. As depicted, the vehicle 100 may include any passenger vehicle (e.g., a car, a truck, a pickup truck, a sports utility vehicle (SUV), a minivan, a crossover utility vehicle (CUV), a cargo van, a towing truck) that may be utilized for transportation and to navigate one or more rural environments, urban environments, and/or off-roading and mountainous environments. In some embodiments, the vehicle 100 may include a gasoline-powered vehicle that may be propelled, for example, by an internal combustion engine (ICE) or other fuel-injection engine.

In some embodiments, the vehicle 100 may include, for example, an electric vehicle (EV), a battery electric vehicle (BEV), a hybrid electric vehicle (HEV), a plug-in hybrid electric vehicle (PHEV), or other vehicle 100 that may be in part or wholly propelled by one or more electric motors (e.g., synchronous electric motors, permanent magnet synchronous electric motors (PMSMs), induction motors (IMs), line start synchronous motors (LSSMs), line start permanent magnet motors (LSPMMs), synchronous reluctance motors (SynRMs) utilizing power stored to one or more batteries included in the vehicle 100.

In some embodiments, the vehicle 100 may include a cargo area 104, for example at a rear or other portion of the vehicle 100. The cargo area 104 can define a space that can be covered by a multi-purpose cover (e.g., tonneau cover).

Figures 1B, 1C:
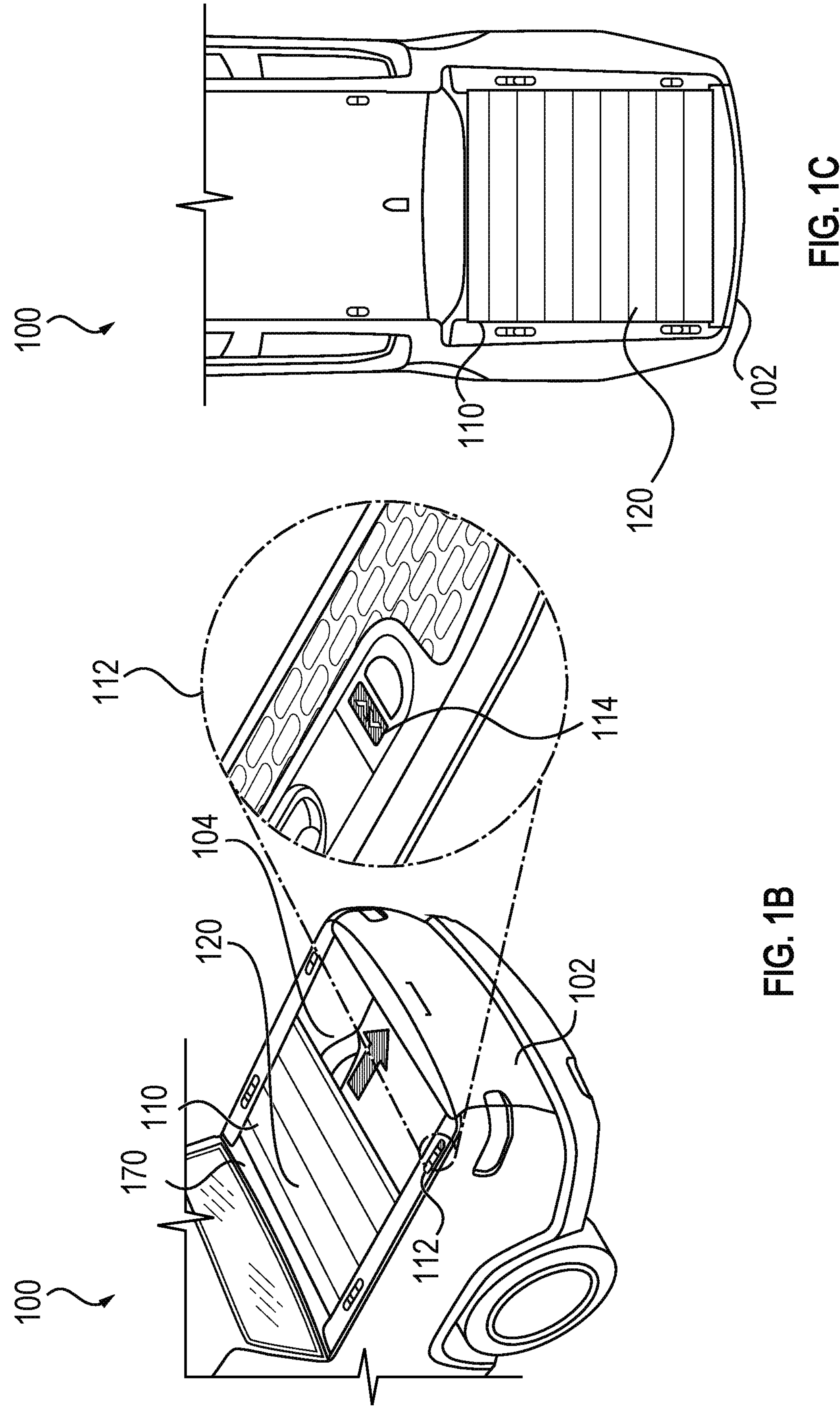
FIG. 1B illustrates a perspective view of a rear portion of a vehicle including a tonneau cover in a partially deployed configuration, in accordance with implementations of the subject technology.
FIG. 1C illustrates a top view of the rear portion of the vehicle of FIG. 1B including the tonneau cover in a fully deployed configuration, in accordance with implementations of the subject technology.

FIGS. 1B and 1C illustrate an example of the vehicle 100 including a multi-purpose cover that is configured to be adjusted to be in one of multiple selectable configurations. In some embodiments, the multi-purpose cover can be a tonneau cover 120. In some embodiments, a driver or owner of the vehicle 100 may desire to couple the tonneau cover 120 to the vehicle 100. For example, as will be further appreciated, the tonneau cover 120 may include any cover (e.g., textile cover, rigid cover) that may be suitable for being adaptably disposed onto the vehicle 100 in one of multiple configurations (e.g., a tonneau cover configuration to extend and retract to protect the cargo area of the vehicle 100 and the driver or owner's cargo from environmental elements).

As further depicted by FIGS. 1B and 1C, in some embodiments, in the deployed configuration, the tonneau cover 120 may be configured to overlap the cargo area 104 of the vehicle 100 by controlling deployment and retraction of the tonneau cover 120 utilizing, for example, one or more cover drivers 112. In some embodiments, the one or more cover drivers 112 may include one or more motion control mechanisms, such as a motor, actuator, gear drive, and the like. The one or more cover drivers 112 may further include one or more supporting features, such as gears, tracks, chains, bands, belts, linkages, rack and pinion mechanisms, and the like, to convert activity of the one or more cover drivers 112 into controlled motion of the tonneau cover 120.

For example, in some embodiments, in the deployed configuration, the tonneau cover 120 may include an electromechanical tonneau cover that may be configured to controllably (e.g., electrically) overlap the cargo area 104 of the vehicle 100. For example, in some embodiments, the tonneau cover 120 may be attached to a perimeter of the cargo area 104 via the one or more cover drivers 112 (e.g., rack and pinion mechanism). For example, in some embodiments, the one or more cover drivers 112 may be utilized to cause the tonneau cover 120 to extend in a first direction so as to cover the cargo area 104 and to retract in a second direction (e.g., opposite the first direction) so as to uncover the cargo area 104.

In some embodiments, the one or more cover drivers 112 may include a rack and pinion mechanism that may operate to cause the tonneau cover 120 to extend in the first direction so as to cover the cargo area 104 and to retract in the second direction (e.g., in a direction opposite the first direction) so as to uncover the cargo area 104 in response to receiving one or more command signals. For example, in some embodiments, the one or more cover drivers 112 may include a user input device 114 (e.g., one or more pushbuttons) that may be utilized by the driver or owner of the vehicle 100 to interact with a control system of the vehicle 100 for operating the tonneau cover 120. For example, in some embodiments, in response to the driver or owner interacting with the user input device 114 (e.g., one or more pushbuttons), the control system (e.g., control circuitry, controllers, and/or processors) may provide one or more command signals to the one or more cover drivers 112 to cause the tonneau cover 120 to extend in the first direction so as to cover the cargo area 104 and to retract in the (e.g., in a horizontal direction opposite the first direction) so as to uncover the cargo area 104.

In some embodiments, the vehicle 100 can further include a cartridge 170 for receiving the tonneau cover 120 while in a retracted configuration. The tonneau cover 120 can be deployed from the cartridge 170, for example with operation of the cover drivers 112. The cartridge 170 can be on a first side of the cargo area 104, for example, near a cab or other region of the vehicle 100.

In some embodiments, the vehicle can further include a tailgate 102 that can transition between an open configuration to provide access to the cargo area and a closed configuration to enclose a portion of the cargo area. The tailgate 102 can be on a second side of the cargo area 104, for example, opposite the cartridge 170. While in the closed configuration, the tonneau cover 120 can be deployed in a direction of the tailgate 102. When fully deployed, the tonneau cover 120 can optionally abut the tailgate 102, for example to form a seal therewith.

Figure 1D:
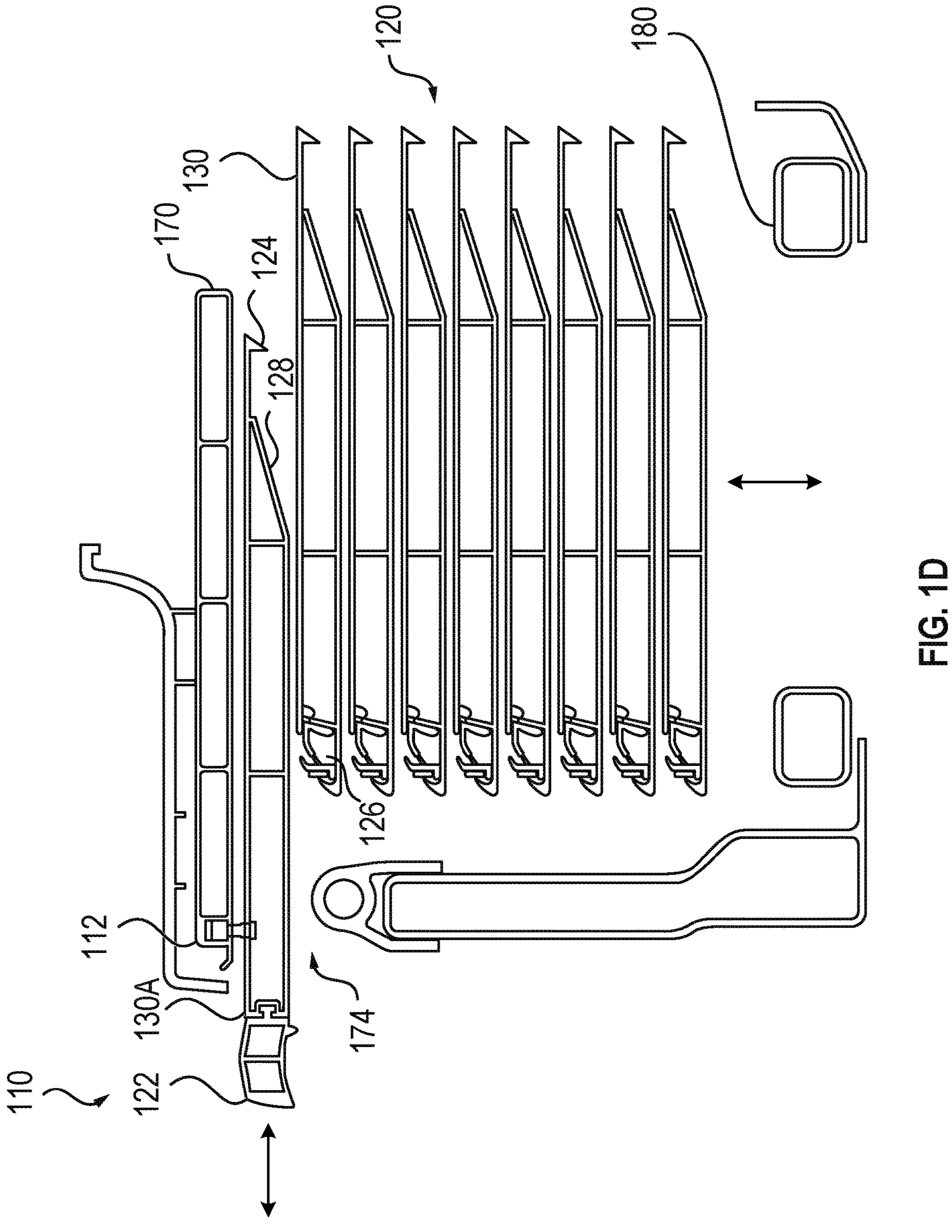
FIG. 1D illustrates a side view of a cover system for controlling deployment of a tonneau cover, in accordance with implementations of the subject technology.

FIG. 1D illustrates a cover system 110 including a cover driver 112, in accordance with the presently disclosed embodiments. The tonneau cover 120 can include multiple panels 130 that can be stored in a retracted configuration within the cartridge 170, as shown in FIG. 1D. The panels 130 can be stored in a stacked arrangement within the cartridge 170 while in the retracted configuration. For example, the ends of the panels 130 can be decoupled from each other while within the cartridge 170.

The tonneau cover 120 can transition from the retracted configuration to the deployed configuration by deploying the panels 130 from the cartridge 170. For example, cover driver 112 can be operated to move a topmost one of the panels 130 in the cartridge 170 (e.g., in the stack) to move out of an opening 174 in the cartridge. The tonneau cover 120 may interact with the cover driver 112 (e.g., a rack and pinion system). For example, the cover driver 112 may include, a pinion portion (e.g., a motorized wheel) interlocking with a rack portion (e.g., at the topmost one of the panels 130) and making one or more circular movements to cause each of multiple panels 130 of the tonneau cover 120 to move in either of two directions (e.g., through the opening 174). Specifically, in accordance with the present embodiments, causing the rack (e.g., formed by the engaged one of the panels 130) to move in either of the two directions may, by extension, cause the tonneau cover 120 to extend in a first direction (e.g., out of the cartridge 170) and to retract in a second direction (e.g., into the cartridge 170).

In the example of FIG. 1D, the endmost panel 130A is at the top of the stack and is in the process of being moved through the opening 174. The endmost panel 130A can optionally include an end seal 122 to engage a tailgate of the vehicle. As each of the panels 130 is deployed out of the cartridge 170 and/or through the opening 174 (e.g., by the cover driver 112), each panel 130 engages an underlying panel 130 to achieve a secure connection there between. For example, one or more of the panels 130 can include a first engager on a first side of the panel 130 and a second engager on a second side of the panel 130, opposite the first side. As shown in FIG. 1D, the first engager can be implemented as a tooth 124, and the second engager can be implemented as a receptacle 126. As an upper one of the panels 130 moves out of the opening 174, the tooth 124 thereof can engage the receptacle 126 of an adjacent and lower other one of the panels 130. The tooth 124 and the receptacle can engage each other, so that the pair of panels 130 coupled thereby move together in unison. For example, the panel 130 having the tooth 124 can pull the panel 130 having the receptacle 126 out of the opening. As any given panel 130 is moved out of the cartridge, a follower assembly 180 can bias the panels 130 still within the cartridge toward the opening 174 to be aligned therewith and to present a corresponding receptacle 126 for engagement by a tooth 124 of a panel 130 that is exiting through the opening 174. This process can be repeated for each of the panels 130 until the last and/or lowermost one of the panels 130 is engaged to form the tonneau cover 120 in a deployed configuration.

It will be understood that the process described herein can be reversed to retract the tonneau cover 120 and the panels 130 thereof into the cartridge 170. As each of the panels 130 is retracted into the cartridge 170 and/or through the opening 174 (e.g., by the cover driver 112), each panel 130 disengages an underlying panel 130 to release the connection there between. For example, as an outer panel 130 is driven (e.g., by the cover driver 112) against an adjacent and inner panel 130 that is already fully within the cartridge 170, the tooth 124 can urge the inner panel 130 downward into the cartridge 170 (e.g., against the bias of the follower assembly 180). Such action can be provided by the shape, geometry, size, and/or other features of the tooth 124 and/or the receptacle 126. By further example, each panel 130 can include a ramp 128 that is also configured to urge the adjacent and inner panel 130 downward into the cartridge 170 (e.g., against the bias of the follower assembly 180) as the outer panel 130 is drive (e.g., by the cover driver 112) into the cartridge 170 and/or through the opening 174. This process can be repeated for each of the panels 130 until the last and/or uppermost one of the panels 130 (e.g., end panel 130A) is within the cartridge 170. Accordingly, the panels 130 can be arranged in a stacked configuration within the cartridge 170.

As described herein, the follower assembly 180 can provide a biasing force to urge each of the panels 130 stacked within the cartridge 170 upwardly and/or toward the opening 174. Accordingly, until all of the panels 130 are deployed, one of the panels 130 can be maintained at the top region of the cartridge 170 and/or aligned with the opening 174 to be engaged by another of the panels 130 that is exiting the cartridge 170 through the opening 174. As the panels 130 are retracted within the cartridge 170, the follower assembly 180 can move downwardly to accommodate the acceptance of each panel 130 in sequence until the stack is formed.

Figure 2:
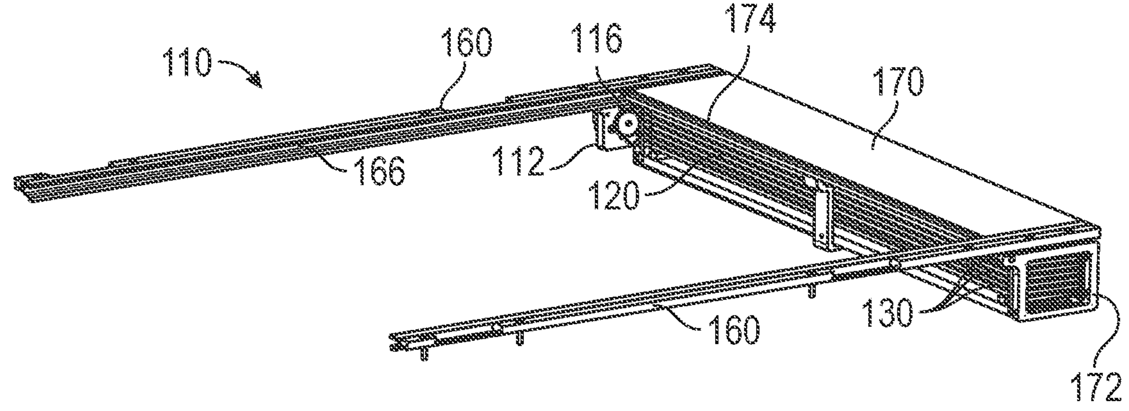
FIG. 2 illustrates a perspective view of a cover system with a tonneau cover in a retracted configuration, in accordance with implementations of the subject technology.
Figure 3:
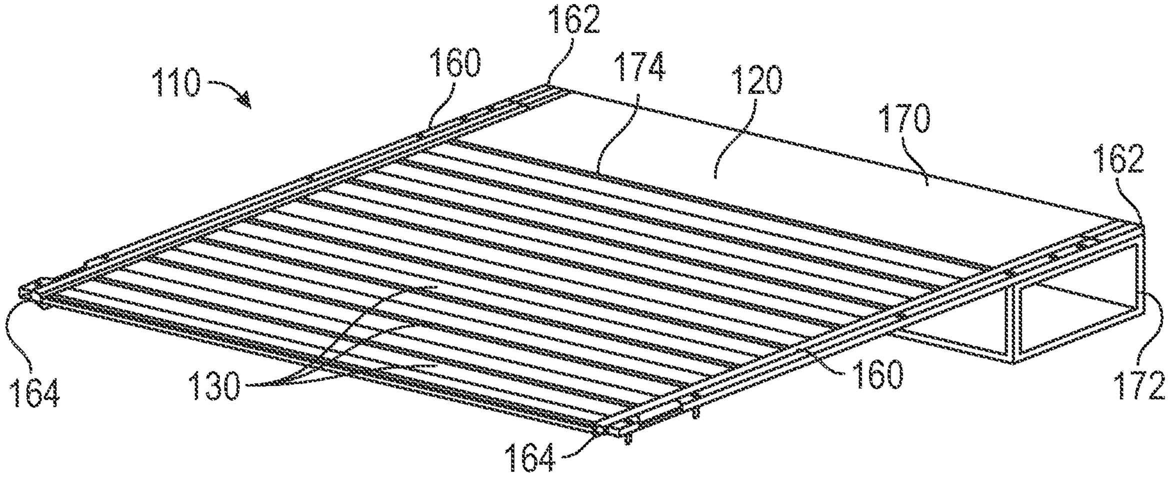
FIG. 3 illustrates a perspective view of the cover system of FIG. 2 with the tonneau cover in a deployed configuration, in accordance with implementations of the subject technology.
Figure 4:
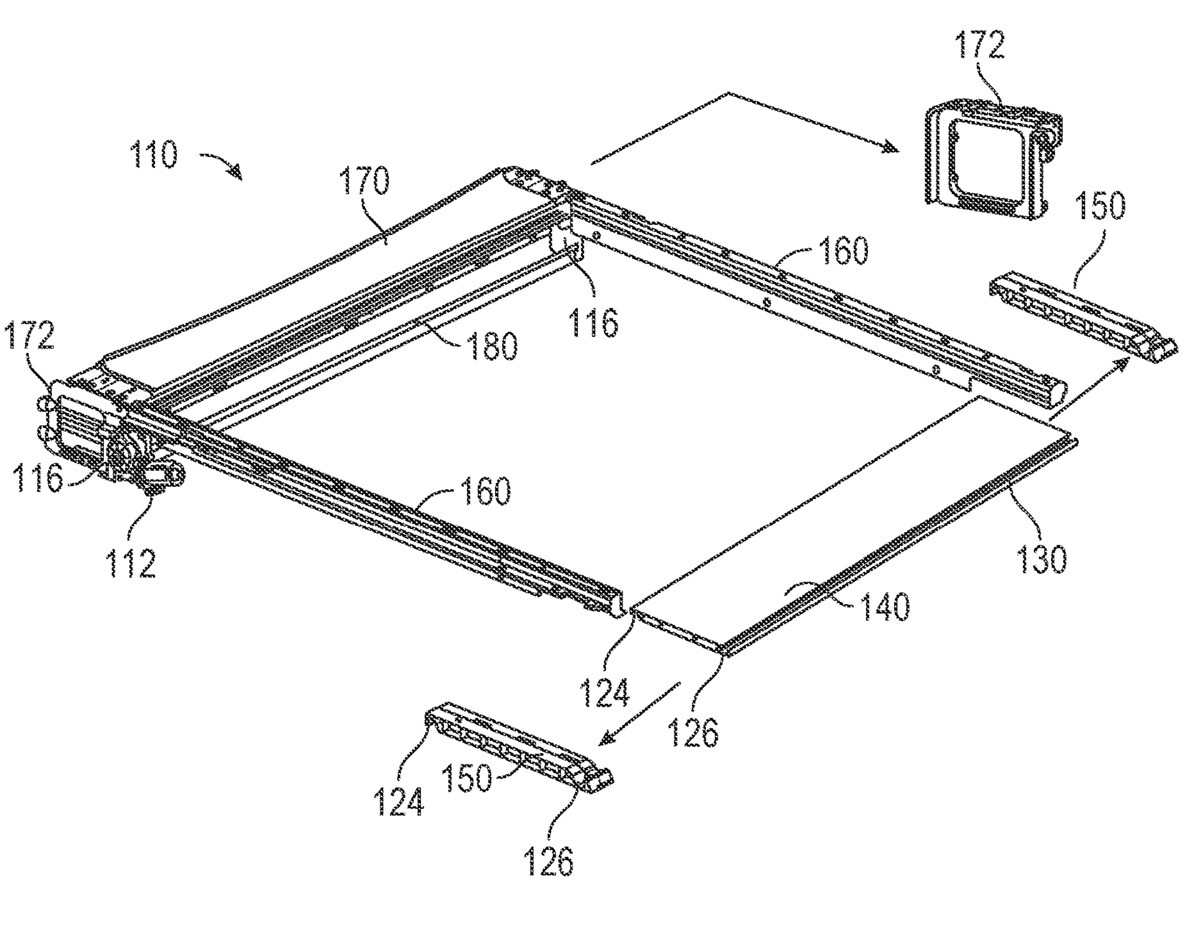
FIG. 4 illustrates a perspective exploded view of a cover system, in accordance with implementations of the subject technology.

Referring now to FIGS. 2-4, a cover system can include features that facilitate deployment and retraction of a tonneau cover having multiple panels.

As shown in FIG. 2, the cover system 110 can include one or more rails 160, such as a pair of rails 160 on opposing sides of the cargo area. In some embodiments, each of the rails 160 can define a channel 166, such as a recess, a concave portion, a convex portion, a protrusion, and the like, to allow one or more panels 130 of the tonneau cover 120 to slide along the rails 160. Each of the rails 160 on opposing sides of the cargo area can include channels 166 that are directly opposite and/or facing each other.

In the fully retracted configuration, as shown in FIG. 2, the panels 130 of the tonneau cover 120 can be positioned within the cartridge 170. For example, the panels 130 can be stowed in a stacked configuration. In the retracted configuration, the panels 130 can be disengaged from each other. As such, the panels 130 can be initially deployed from the cartridge 170 one at a time. As the panels 130 are deployed, they can engage each other to facilitate deployment of the tonneau cover 120.

In the fully deployed configuration, as shown in FIG. 3, the panels 130 can extend along the rails 160 while the panels 130 are connected to each other. For example, the panels 130 can be coupled end-to-end when the tonneau cover 120 is in a deployed configuration. Such engagement can be achieved while the panels 130 are deployed from the cartridge 170 and/or through the opening 174. The panels 130 can form a continuous and sealed (e.g., water-tight) barrier covering the cargo area. As further shown, the panels 130 of the tonneau cover 120 can extend from a first end 162 (e.g., at the cartridge 170) of the rails 160 to a second end 164 (e.g., at a tailgate) of the rails 160.

As shown in FIG. 4, the cover driver 112 can be provided to engage one or more panels 130 and push or pull the panels 130 into or out of the cartridge 170 and/or along the rails 160. While only one cover driver 112 is shown, it will be understood that any number of cover drivers can be provided and engage the panels 130 at any one or more portions thereof. It will be further understood that a single driver component (e.g., motor) can be operated to control multiple engagement features (e.g., pinion gears 116) that each engage corresponding ones of multiple structures (e.g., racks) on each of the panels 130. As such, the forces can be distributed and evenly balanced across the panels 130.

As further shown in FIG. 4, each panel 130 can include a slat 140 and one or more sliders 150. The slats 140 can extend across a portion of the space between the rails 160. The sliders 150 can be positioned at each of opposing ends of the slat 140 to facilitate movement along corresponding rails 160. For example, the sliders 150 can provide a shape, size, and/or geometry that is complementary to that of the rails 160 (e.g., at the channels thereof). As such, the sliders 150 can facilitate smooth motion of the panels 130 along the rails 160.

The cartridge 170 can include one or more end caps 172. The end caps 172 can cover opposing ends of the cartridge 170 to secure the panels 130 therein while they are in the retracted configuration. In some embodiments, the end caps 172 can be removed to access the panels 130 within the cartridge 170.

Figure 5:
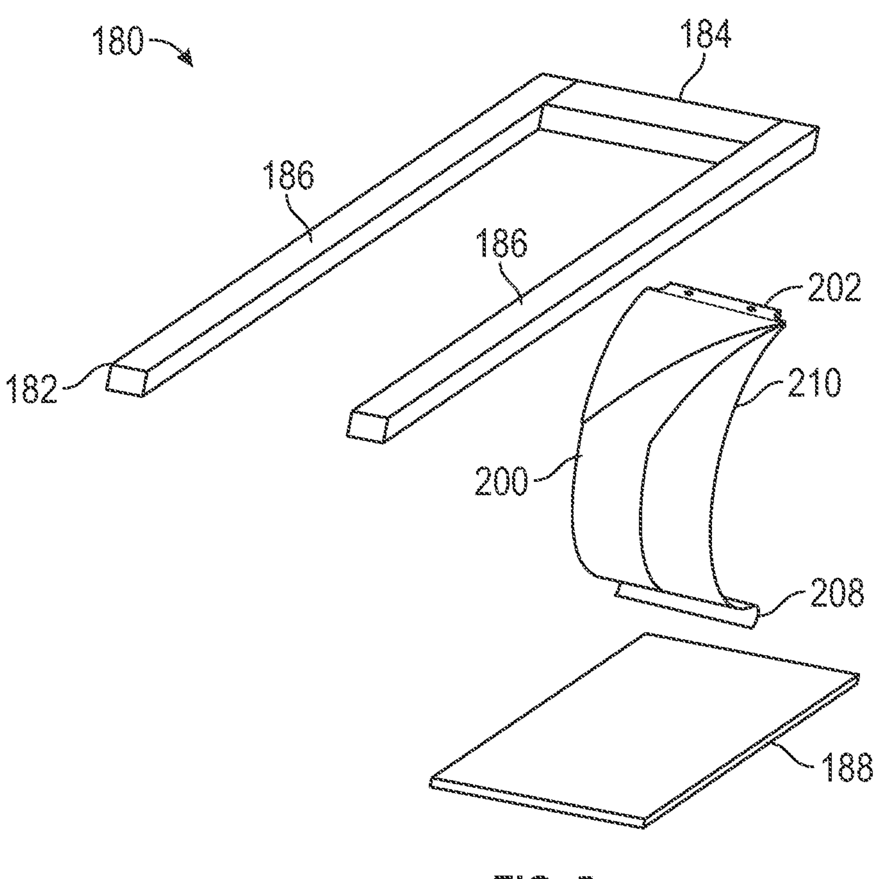
FIG. 5 illustrates a perspective exploded view of a follower assembly for a cover system, in accordance with implementations of the subject technology.
Figure 6:
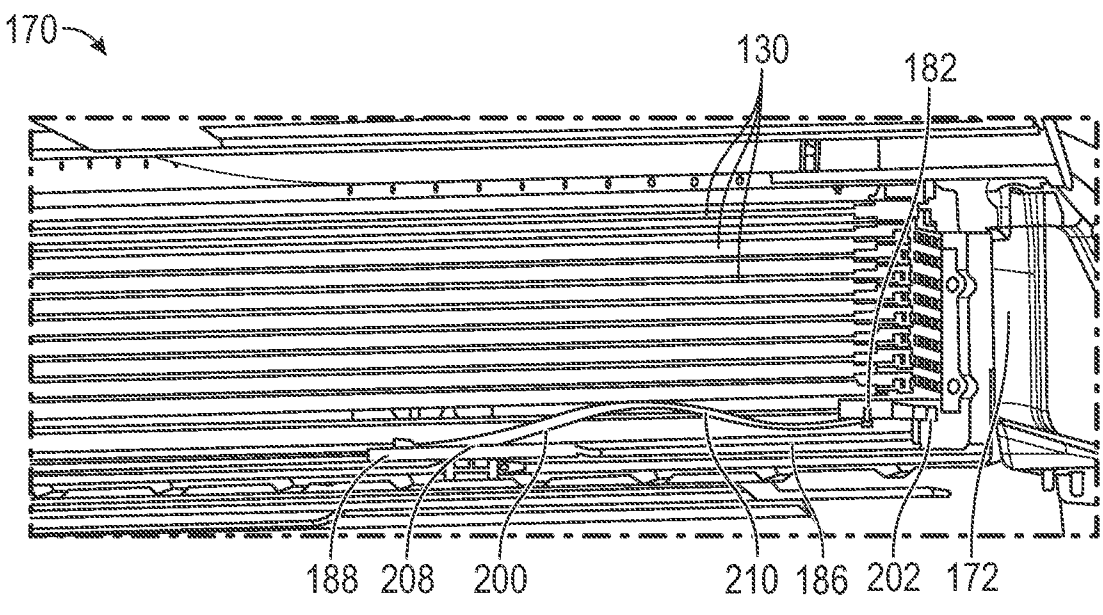
FIG. 6 illustrates a front view of a portion of a cover system with a tonneau cover in a retracted configuration, in accordance with implementations of the subject technology.

Referring now to FIGS. 5 and 6, a follower assembly 180 can be provided within the cartridge to bias the panels 130 stowed in the retracted configuration. In some embodiments, the follower assembly 180 can include a follower 182 that travels vertically within the cartridge. The follower 182 can include a beam 184 and one or more arms 186 extending from the beam 184. The follower 182 can provide a shape that supports the panels applied thereto. For example, the follower 182 can maintain the panels in a particular orientation. By further example, the follower 182 can distribute biasing forces evenly across the panels.

A spring assembly 200 can be provided to bias the follower 182 and any panels supported thereon. The spring assembly 200 can be coupled to the follower 182 at an engagement end 202 of the spring assembly 200. The spring assembly 200 can be coupled at the beam 184 at a lateral end of the follower 182. It will be understood that the spring assembly 200 can be coupled at one or more other portions of the follower 182. In some embodiments, each follower 182 can be coupled to one or more spring assemblies 200. In some embodiments, each spring assembly 200 can be coupled to one or more followers 182. The engagement end 202 of the spring assembly 200 can travel with the follower 182. A sliding end 208 of the spring assembly 200 can be provided at an end of the spring assembly that is opposite the engagement end 202. The spring assembly 200 can slide with the sliding end 208 laterally across a support plate 188. In some embodiments, the sliding end 208 can include a curvature that bends in a first direction (e.g., convex with respect to the support plate 188). This can allow the sliding end 208 to slide with minimal friction across the support plate 188. In some embodiments, the body 210 can include a curvature that bends in a second direction (e.g., concave with respect to the support plate 188), opposite the first direction. This can allow the body 210 to bend away from the support plate 188 to avoid interference therewith. The spring assembly 200 can further include a body 210 between the engagement end 202 and the sliding end 208. The body 210 can bend as needed in response to downward forces applied by panels as the panels 130 are loaded into the cartridge. The body 210 can include at least one curved portion that is elastically deformable in response to forces applied by the panels 130 within the cartridge 170.

The body 210 of the spring assembly 200 can include a width that is smaller than a width separating the arms 186 of the follower 182. For example, the body 210 can nest and/or pass between the arms 186 of the follower 182 upon flexion of the spring assembly 200 at the engagement end 202 thereof as the sliding end 208 slides along the support plate 188. This can allow the body 210 to protrude beyond the follower 182 and engage with other structures, such as the panels supported thereon. Upon such engagement, the body 210 can be acted upon by the panels. From such an interaction with the panels, the spring assembly 200 can further deform (e.g., flatten) across the length of the body 210 as the body 210 is flattened at least somewhat from its curved shape.

As shown in FIG. 6, a stack of panels 130 can depress the follower 182 to cause the spring assembly 200 to slide across the support plate 188 (e.g., with the sliding end 208). Such a deformation of the spring assembly 200 (e.g., with bending at the engagement end 202) can continue until the spring assembly 200 (e.g., with the body 210) extends substantially across and/or in contact with the bottommost one of the panels 130. In particular, the sliding end 208 of the spring assembly 200 can slide along the support plate 188 until the body 210 nests within and/or passes between the arms 186 of the follower 182. Such depression of the panels 130 and/or the follower 182 up to this point can cause the spring assembly 200 to be deformed (e.g., with bending at the engagement end 202) to provide a first response force directly against the follower 182, rather than directly against the panels 130. The first response force can be primarily defined by the interaction of bending at the engagement end 202.

Further depression of the panels 130 can provide a different response force profile. For example, once the body 210 of the spring assembly 200 extends through the follower

182 between the arms 186 thereof, it can directly engage the bottommost one of the panels 130. Thereafter, further depression of the panels 130 and/or the follower 182 can cause the spring assembly 200 to be flattened along the body 210 thereof as it provides a second response force directly against the bottommost one of the panels 130. The second response force can be defined by the combined interaction of bending at the engagement end 202 and flattening along the body 210. As such, the spring assembly 200 can provide variable force profiles across different stages of retraction and deployment of the panels 130.

The spring assembly 200 can be calibrated so that the second response force is only provided when all panels 130 are within the cartridge. As such, the spring assembly 200 can provide greater biasing forces in preparation for initial deployment of the endmost one of the panels 130. Such biasing forces can assist with initial engagement of the cover driver with the endmost one of the panels 130. Such biasing forces can also assist with initial engagement of the cover driver with the endmost one of the panels 130 and/or engagement with the next panel 130 that follows the endmost one of the panels 130.

It will be understood that the follower assemblies 180 shown in FIGS. 5 and 6 represent only one follower assembly 180. It will be further understood that the cover system can include multiple follower assemblies 180 within the cartridge 170. For example, a pair of spring assemblies 200 can be provided on opposing lateral sides of the cartridge 170. The spring assemblies 200 can be coupled to the same or different followers 182. Such an opposing pair of spring assemblies 200 can face each other and/or slide toward and away from each other upon movement of the follower 182.

While the spring assemblies 200 are shown as being coupled to the follower 182 with the engagement end 202 and slidable across the support plate 188 on a lower side of the cartridge 170 with the sliding end 208, it will be understood that the spring assemblies 200 can be coupled to a lower side of the cartridge 170 with the engagement end 202 and extend upwards with a sliding end 208 that slidably engages the panels 130 and/or the follower 182.

Figures 7, 8:
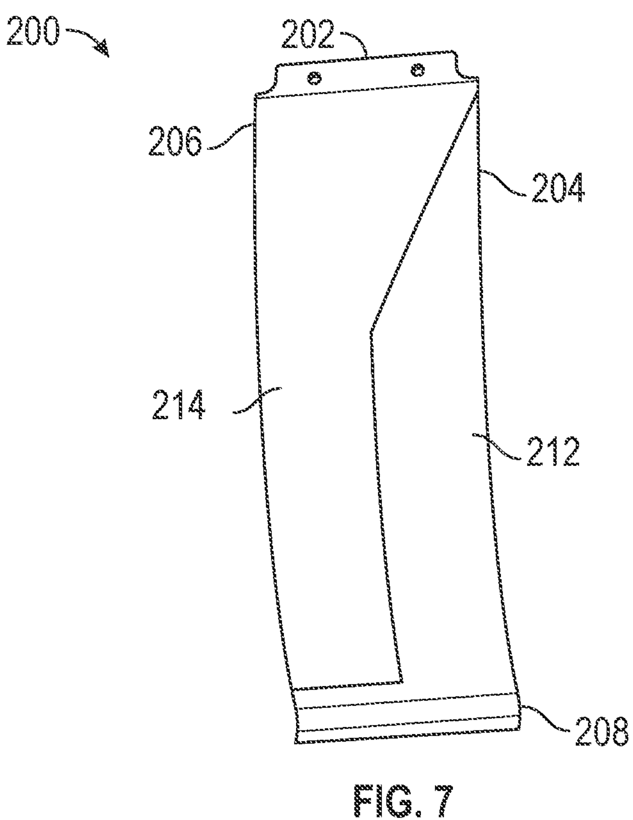
FIG. 7 illustrates a perspective view of a spring assembly, in accordance with implementations of the subject technology.
FIG. 8 illustrates a perspective view of a spring assembly, in accordance with implementations of the subject technology.
Figure 9:
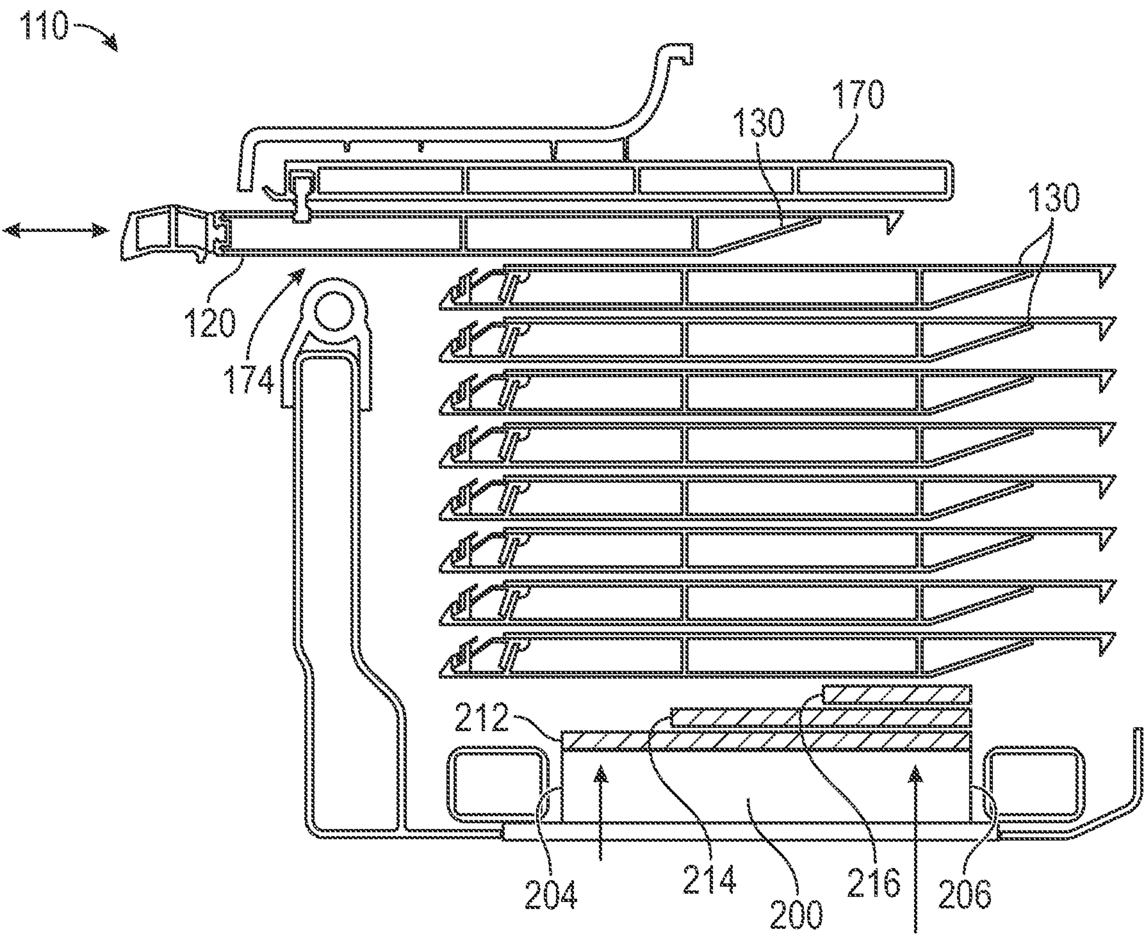
FIG. 9 illustrates a side view of a cover system with a spring assembly, in accordance with implementations of the subject technology.

Referring now to FIGS. 7-9, one or more spring assemblies can include multiple layered spring elements or regions with variable thickness to provide various and targeted spring responses across different regions.

In some embodiments, as shown in FIG. 7, a spring assembly 200 can be formed by stacking multiple spring elements of different shapes. For example, a first spring element 212 can be provided with a first length (e.g., extending entirely from the engagement end 202 to the sliding end 208). A second spring element 214 can be provided as a layer overlapping the first spring element 212. The second spring element 214 can have a different shape, size, and/or geometry than the first spring element 212. In some embodiments, the second spring element 214 can provide more structure and/or extend a greater length along a first side 204 of the spring assembly 200 than it does along a second side 206 of the spring assembly 200. As such, the spring assembly 200 can provide unbalanced biasing forces across the first side 204 and the second side 206 thereof. In particular, the spring assembly 200 including the second spring element 214 can provide greater biasing forces from the second side 206 to the follower and/or panels than from the first side 204. In some embodiments, the second spring element 214 can have a second length that is less than the first length of the first spring element 212. For example, the second spring element 214 can extend from the engagement end 202 without reaching to the sliding end 208. In some embodiments, the second spring element 214 can include a cutout that forms an angle. This can provide variable width along the length of the second spring element 214. For example, the second spring element 214 can have a smaller width than that of the first spring element 212 at one or more portions of the spring assembly 200. The angle(s) and the width(s) of the second spring element 214 can be fine-tuned to achieve the desired spring response characteristics.

In some embodiments, as shown in FIG. 8, a spring assembly 200 can be formed by stacking three or more spring elements of different shapes. For example, a first spring element 212 can be provided with a first length (e.g., extending entirely from the engagement end 202 to the sliding end 208), a second spring element 214 can be provided as a layer overlapping the first spring element 212, and a third spring element 216 can be provided as a layer overlapping the first spring element 212 and the second spring element 214. The second spring element 214 can have a different shape, size, and/or geometry than the first spring element 212, and the third spring element 216 can have a different shape, size, and/or geometry than either of the first spring element 212 or second spring element 214. In some embodiments, each of the second spring element 214 and the third spring element 216 can provide more structure and/or extend a greater length along a first side 204 of the spring assembly 200 than it does along a second side 206 of the spring assembly 200. As such, the spring assembly 200 can provide unbalanced biasing forces across the first side 204 and the second side 206 thereof. In particular, the spring assembly 200 including the second spring element 214 and the third spring element 216 can provide greater biasing forces from the second side 206 to the follower and/or panels than from the first side 204. In some embodiments, the second spring element 214 can have a second length that is less than the first length of the first spring element 212, and the third spring element 216 can have a third length that is less than the first length of the first spring element 212 and the second length of the second spring element 214. For example, the second spring element 214 and the third spring element 216 can each extend from the engagement end 202 without reaching to the sliding end 208. In some embodiments, the second spring element 214 can include a cutout that forms an angle, and the third spring element 216 can include a cutout that forms another, different angle. This can provide variable width along the length of the second spring element 214 and along the length of the third spring element 216. For example, the second spring element 214 can have a smaller width than that of the first spring element 212 at one or more portions of the spring assembly 200, and the third spring element 216 can have a smaller width than that of either the first spring element 212 or the second spring element 214 at one or more portions of the spring assembly 200. The angle(s) and the width(s) of the second spring element 214 and the third spring element 216 can be fine-tuned to achieve the desired spring response characteristics.

While the spring elements of the spring assembly 200 can be stacked in some embodiments, the spring elements can additionally or alternatively be monolithically formed (e.g., by casting, etc.) to be one solid piece having the different portions, for example with different thicknesses. The variable thicknesses can represent the different layers shown in FIGS. 7 and 8. In some embodiments, the spring assembly 200 can be laser cut or die cut.

It will be understood that a variety of shapes, profiles, thicknesses, and other arrangements of spring elements can be provided to achieve the desired force profile. In some embodiments, each spring element can have a consistent or variable thickness across its length and/or width. While the embodiments of FIGS. 7 and 8 are shown with cutout portions, it will be understood that multiple spring elements can extend across the same width and/or length both still providing variable force profiles, such as by providing different thicknesses.

As shown in FIG. 9, in some embodiments, at least some of the spring elements (e.g., spring elements 212, 214, and 216) can be arranged such that a density of spring elements (e.g., number of layers) is greater at the second side 206 of the spring assembly 200 relative to the first side 204 of the spring assembly 200. Such an arrangement can provide greater biasing forces on a side of the cartridge 170 that faces away from and/or is opposite the opening 174. Such an arrangement can provide lower biasing forces on a side of the cartridge 170 that faces toward and/or includes the opening 174. As such, forces applied to the panels 130 (e.g., directly and/or indirectly via a follower) can be greater on a second side thereof than on a first side thereof. Biasing forces can be sufficient to urge the receptacles of underlying panels 130 upward into engagement teeth of an overlapping panel 130 as it is driven out of the cartridge 170. This can help ensure that engagement between panels 130 results in secure connections therebetween as the panels 130 are deployed out of the cartridge 170. Biasing forces can also be managed to minimize friction between panels 130, thereby reducing the drag on panels 130 as they are driven out of the cartridge 170. This can help ensure that an engaged panel 130 is allowed to move with the panel 130 by which it is engaged, rather than retained within the cartridge 170.

Accordingly, the bias provided by the spring assemblies 200 described herein may maintain a sufficiently balanced force profile against the panels 130. Such an interaction provided by the spring assemblies 200 can help prevent binding of the sliders when loading and/or unloading the panels 130. Also, by balancing the forces across the spring assembly 200, the sliding of the spring elements across the support plate 188 can be sufficiently balanced to provide sufficiently smooth movement. This can help prevent hang-ups in operation as well as reduce noise generated during retraction and deployment.

Figure 10:
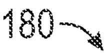
FIG. 10 illustrates a front view of a follower assembly, in accordance with implementations of the subject technology.
Figure 10:
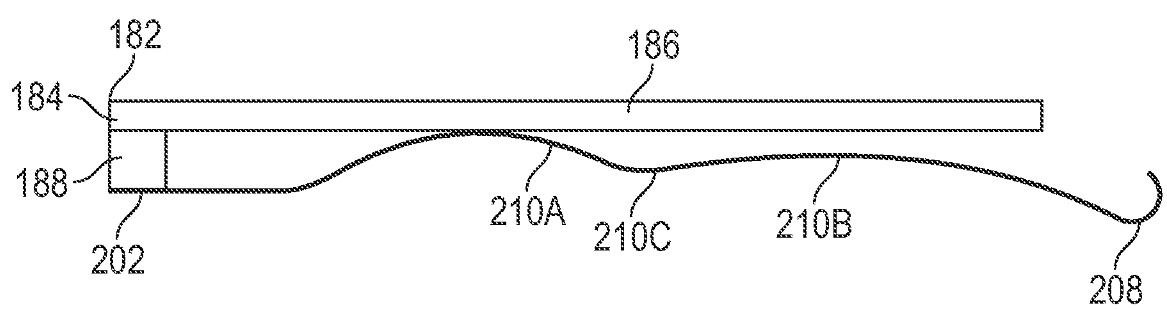

Referring now to FIG. 10, a follower assembly 180 can include a spring assembly 200 that includes a profile and/or shape to engage panels 130 in a particular way. For example, a spring assembly 200 can include one or more curves (e.g., a second curve) that, upon depression of the follower 182, contacts a panel 130 at a sufficiently early stage to apply the desired biasing load during loading of the panels 130. In some embodiments, the engagement of the spring assembly 200 against the panel 130 can be based on the curvature of the spring assembly 200 (e.g., along the body 210). For example, the spring assembly 200 can have a first curve at a first body portion 210A and a second curve at a second body portion 210B. Each of the curves of the first body portion 210A and the second body portion 210B can protrude in a same direction (e.g., convex towards the follower 182 and/or the panels. In some embodiments, the first body portion 210A and the second body portion 210B can be defined as distinct by a change in a direction of curvature along at least a portion of the body 210 (e.g., a third body portion 210C) between the first body portion 210A and the second body portion 210B. For example, the third body portion 210C can protrude in a direction (e.g., convex away from the follower 182 and/or the panels) that is opposite the direction of protrusion for the first body portion 210A and the second body portion 210B. At least one curve (e.g., at the first body portion 210A) of the spring assembly 200 can define a relatively higher (e.g., highest) portion of the spring assembly 200 that rises to a sufficient elevation that is close to and/or extending through the follower 182 in response to a relatively lesser extent of depression of the follower 182. As such, the first body portion 210A can engage the panels directly at an earlier point in time and/or in response to a relatively lesser extent of depression of the follower 182. The other one of the curves (e.g., at the second body portion 210B) of the spring assembly 200 can define a relatively lower portion of the spring assembly 200 that rises to a sufficient elevation that is close to and/or extending through the follower 182 in response to a relatively greater extent of depression of the follower 182. As such, the second body portion 210B can engage the panels directly at a later point in time and/or in response to a relatively greater extent of depression of the follower 182. It will be understood that the second body portion 210B can extend through the follower 182 and/or engage the panels after and while the first body portion 210A also extends through the follower 182 and/or engages the panels.

Accordingly, the separate curves of the first body portion 210A and the second body portion 210B can provide yet more diverse response force profiles. For example, in addition to the first response force described herein (e.g., primarily defined by the interaction of bending at the engagement end 202), the first body portion 210A can provide the second response force described herein (e.g., defined by the combined interaction of bending at the engagement end 202 and flattening along the first body portion 210A), and the second body portion 210B can provide a third response force. The third response force can be defined by the combined interaction of bending at the engagement end 202, the flattening along the first body portion 210A, and the flattening along the second body portion 210B. As such, the spring assembly 200 can provide variable force profiles across different stages of retraction and deployment of the panels 130.

It will be understood that the curvature of the spring assembly 200 can be selected such that the spring assembly 200 engages the panel 130 at a desired point in time during loading and provides the desired force profile, thereby stabilizing the panels 130 during loading. It will be further understood that the spring assembly 200 can include any number of curves and/or body portions to provide distinct changes in response force profiles when each comes into contact with the panels.

Figure 11:
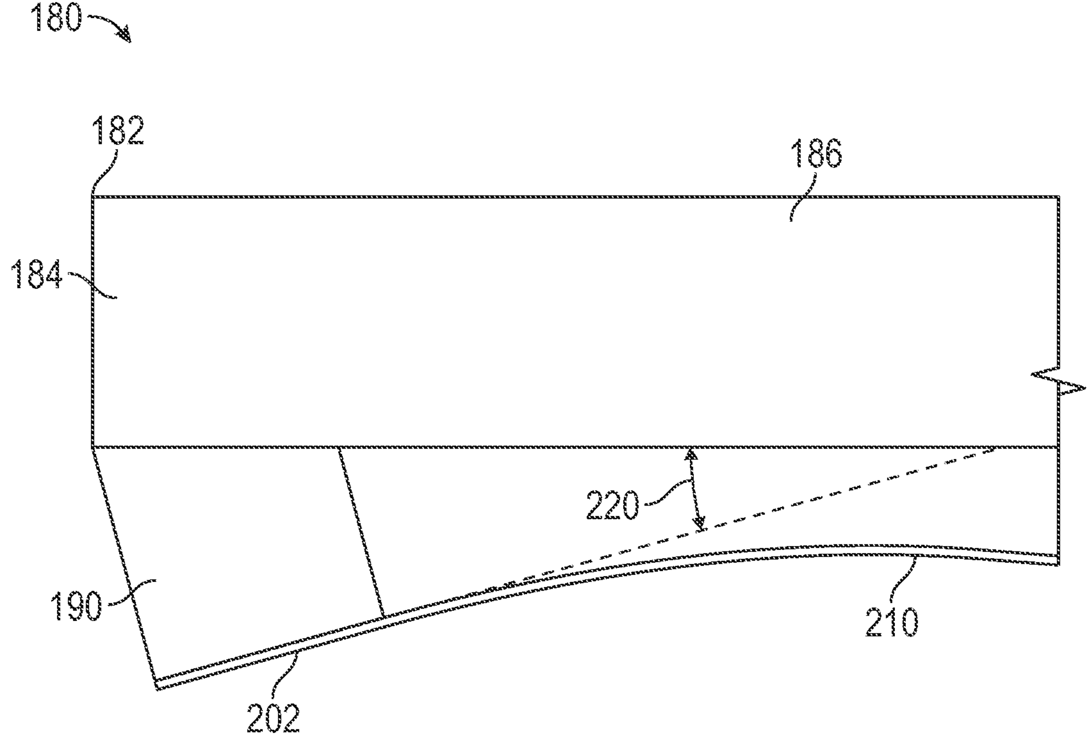
FIG. 11 illustrates a front view of a portion of a follower assembly, in accordance with implementations of the subject technology.

Referring now to FIG. 11, a follower assembly 180 can include a spring assembly 200 that couples a spring assembly 200 to a follower in a particular orientation. For example, a spring assembly 200 can be coupled to a follower 182 by a mount 190 that supports the engagement end 202 of the spring assembly 200 at an angle 220 with respect to a direction of extension (e.g., first direction) of the follower 182 (e.g., the arms 186 of the follower 182). It will be understood that the mount 190 can be a monolithic and/or integral portion of the follower 182 and/or a separate component coupled thereto (e.g., at the beam 184). The angle 220 can be formed by the engagement end 202, and it will be understood that the body 210 or other portion of the spring assembly 200 can be curved to diverge from a second direction defined by the angle 220 at the mount 190. Initially, from the mount 190, the body 210 can extend in the second direction generally toward the follower 182 (e.g., the arms 186) and curve away from the follower 182 as the body 210 extends further away from the mount 190. By further example, the angle 220 formed between the follower 182 and the mount 190 can be a nonzero angle, such that a portion of the spring assembly 200 that is extending from the mount is initially directed toward the follower. By further example, the angle 220 can be a nonzero angle that is less than 5°, 10°, 15°, 20°, 25°, 30°, 35°, 40°, 45°, or 50°. As such, during loading of panels and upon depression of the follower 182, the spring assembly 200 can extend between the arms 186 of the follower 182 and contact a bottommost panel at a sufficiently early stage to apply the desired biasing load during loading of the panels, thereby stabilizing the panels during loading.

Figure 12:
FIG. 12 illustrates a front view of a cover system with a tonneau cover in a deployed configuration, in accordance with implementations of the subject technology.
Figure 12:
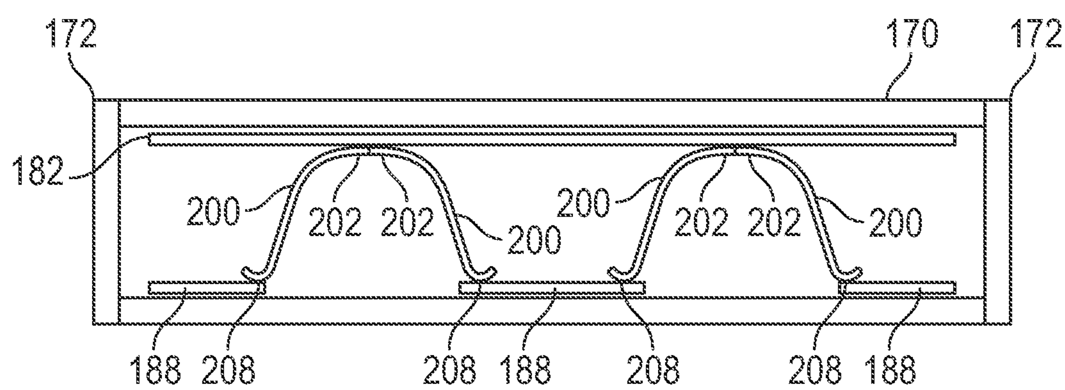
Figure 13:
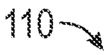
FIG. 13 illustrates a front view of a cover system of FIG. 12 with the tonneau cover in a retracted configuration, in accordance with implementations of the subject technology.
Figure 13:
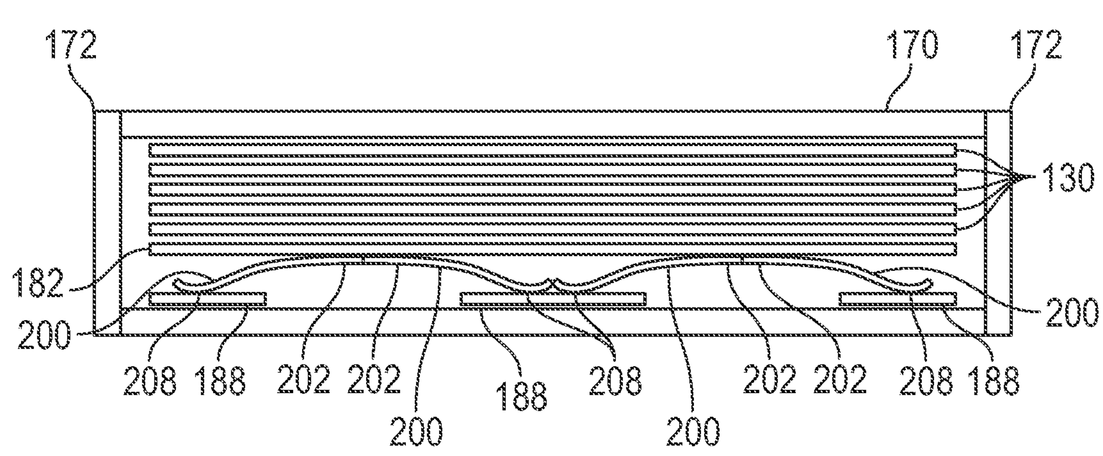

Referring now to FIGS. 12 and 13, a tonneau cover 120 can include a follower assembly 180 with multiple spring elements mounted at various locations. In some embodiments, as shown in FIG. 12, a follower 182 can extend across the cartridge 170 to receive the panels 130. Multiple spring assemblies 200 can extend from the follower 182. By further example, pairs of spring assemblies 200 can extend from any given mount for attachment to the follower 182. The spring assemblies 200 of any given pair can optionally extend in opposing directions, such that the spring assemblies 200 provide balanced forces at the mount for attachment to the follower 182. As further shown in FIG. 12, multiple pairs of spring assemblies 200 can be provided, each pair extending in different directions from a given mount for attachment to the follower 182 (e.g., four spring assemblies 200 mounted in two double-arch configurations). One or more support plates 188 can be provided to facilitate sliding of the corresponding spring assemblies 200. Such an arrangement can distribute the forces from the spring assemblies 200 broadly across the follower 182, the support plates 188, and the panels 130 directly engaged by the spring assemblies 200. Such distribution can reduce the risk of binding as well a noise generated. This also helps stabilize side-to-side forces and motion during loading and/or unloading. It will be understood that the spring assemblies 200 and related structures can include any one or more of those described herein. For example, each of the spring assemblies 200 of FIGS. 12 and 13 can optionally include multiple spring elements having different characteristics to provide a variable force profile.

As shown in FIG. 13, as the panels 130 are received into the cartridge 170, the follower 182 is depressed, and the spring assemblies 200 bend and slide to facilitate downward movement of the follower 182. In particular, the spring assemblies 200 can bend about engagement ends 202 thereof and slide with sliding ends 208 along support plates 188. The response force provided by the spring assemblies 200 can correspondingly increase, including any one or more additional response forces provided by direct engagement with the panels 130.

Figure 14:
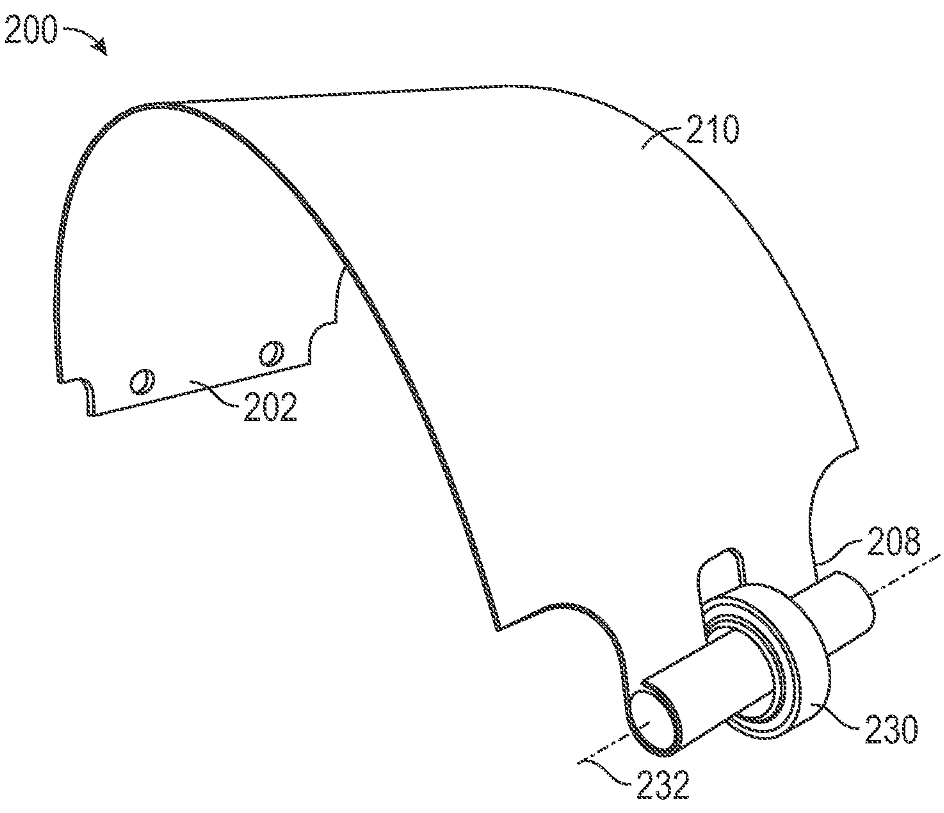
FIG. 14 illustrates a perspective view of a spring assembly, in accordance with implementations of the subject technology.
Figure 15:
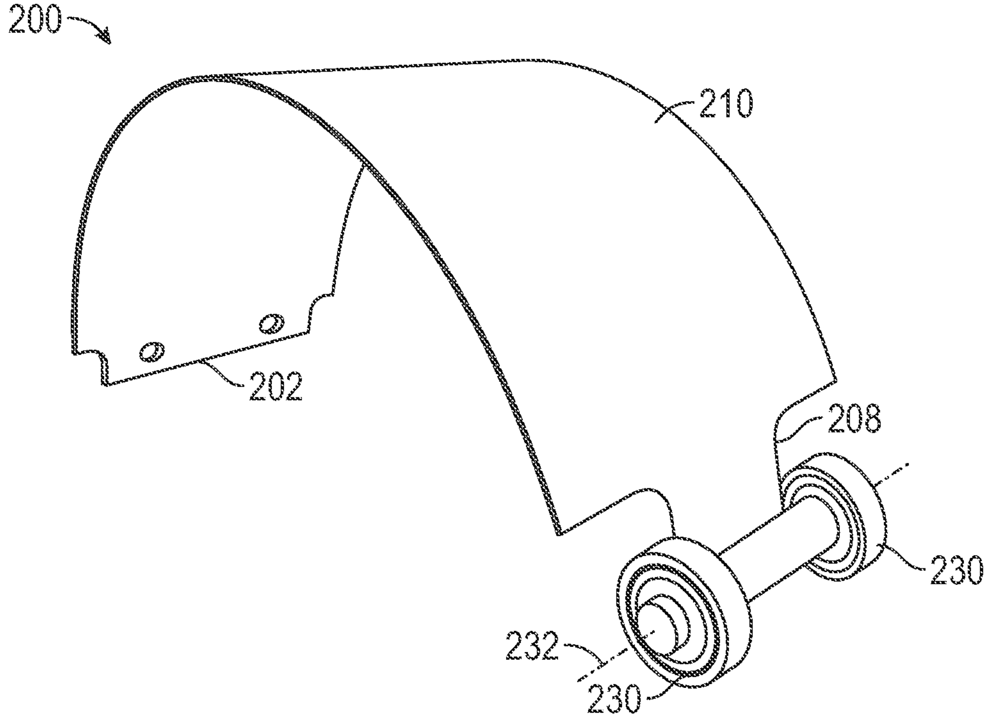
FIG. 15 illustrates a perspective view of a spring assembly, in accordance with implementations of the subject technology.

Referring now to FIGS. 14 and 15, operation of the spring assemblies can be enhanced with one or more rollers to facilitate sliding. As shown in FIG. 14, a spring assembly 200 can include a roller 230 positioned at or near the sliding and 208 thereof. For example, the roller 230 can be positioned at an end of the spring assembly 200 that is opposite the engagement end 202. The body 210 can join the engagement end 202 to the sliding end 208. The roller 230 can include a wheel or other structure that is configured to rotate with respect to the sliding end 208 of the spring assembly 200. The roller 230 can include a bearing, axle, or other structure to facilitate rotation. For example, the roller 230 can rotate about an axis 232 that extends through a portion of the sliding end 208.

As shown in FIG. 15, a spring assembly 200 can include multiple rollers 230. Each of the rollers 230 can be configured to rotate about a same axis 232 that extends through a portion of the sliding end 208. The distribution of the multiple rollers 230 can be selected to provide stability as the sliding end 208 travels across a surface during bending of the spring assembly 200. It will be understood that a variety of other structures can be provided, including any number of rollers 230 and/or distribution thereof.

The one or more rollers 230 of such spring assemblies 200 can facilitate sliding across a support plate or other structure of the cartridge by reducing friction. This can enhance the ease with which panels are received into the cartridge against the biasing forces of the follower assembly. This can also enhance the responsiveness of response forces from the spring assembly 200 as it applies forces (e.g., directly or indirectly) to the panels. Accordingly, the use of one or more rollers 230 can further reduce the wear on the sliding end 208 of the spring assembly 200 as well as on the support plate of the cartridge.

Accordingly, aspects of the subject disclosure provide cover systems that include spring assemblies for facilitating loading and unloading of panels linearly and with high stability. Such spring assemblies and other features of follower assemblies can provide smooth deployment and retraction of the tonneau cover. A tonneau cover can include individual panels that interlock with each other upon deployment and disconnect from each other upon retraction to controllably cover a truck bed or other region of a vehicle, such as a truck.

The following patents and applications are hereby incorporated by reference in their entirety, as is fully set forth herein: U.S. Pat. Nos. 11,318,826; 10,525,804; 11,091,013; and U.S. Pat. Pub. No. 2022/0048435.

A reference to an element in the singular is not intended to mean one and only one unless specifically so stated, but rather one or more. For example, "a" module may refer to one or more modules. An element proceeded by "a," "an," "the," or "said" does not, without further constraints, preclude the existence of additional same elements.

Headings and subheadings, if any, are used for convenience only and do not limit the invention. The word exemplary is used to mean serving as an example or illustration. To the extent that the term include, have, or the like is used, such term is intended to be inclusive in a manner similar to the term comprise as comprise is interpreted when employed as a transitional word in a claim. Relational terms such as first and second and the like may be used to distinguish one entity or action from another without necessarily requiring or implying any actual such relationship or order between such entities or actions.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

A phrase "at least one of" preceding a series of items, with the terms "and" or "or" to separate any of the items, modifies the list as a whole, rather than each member of the list. The phrase "at least one of" does not require selection of at least one item; rather, the phrase allows a meaning that includes at least one of any one of the items, and/or at least one of any combination of the items, and/or at least one of each of the items. By way of example, each of the phrases "at least one of A, B, and C" or "at least one of A, B, or C" refers to only A, only B, or only C; any combination of A, B, and C; and/or at least one of each of A, B, and C.

It is understood that the specific order or hierarchy of steps, operations, or processes disclosed is an illustration of exemplary approaches. Unless explicitly stated otherwise, it is understood that the specific order or hierarchy of steps, operations, or processes may be performed in different order. Some of the steps, operations, or processes may be performed simultaneously. The accompanying method claims, if any, present elements of the various steps, operations or processes in a sample order, and are not meant to be limited to the specific order or hierarchy presented. These may be performed in serial, linearly, in parallel or in different order. It should be understood that the described instructions, operations, and systems can generally be integrated together in a single software/hardware product or packaged into multiple software/hardware products.

In one aspect, a term coupled or the like may refer to being directly coupled. In another aspect, a term coupled or the like may refer to being indirectly coupled.

Terms such as top, bottom, front, rear, side, horizontal, vertical, and the like refer to an arbitrary frame of reference, rather than to the ordinary gravitational frame of reference. Thus, such a term may extend upwardly, downwardly, diagonally, or horizontally in a gravitational frame of reference.

The disclosure is provided to enable any person skilled in the art to practice the various aspects described herein. In some instances, well-known structures and components are shown in block diagram form in order to avoid obscuring the concepts of the subject technology. The disclosure provides various examples of the subject technology, and the subject technology is not limited to these examples. Various modifications to these aspects will be readily apparent to those skilled in the art, and the principles described herein may be applied to other aspects.

All structural and functional equivalents to the elements of the various aspects described throughout the disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f), unless the element is expressly recited using the phrase "means for" or, in the case of a method claim, the element is recited using the phrase "step for".

Those of skill in the art would appreciate that the various illustrative blocks, modules, elements, components, methods, and algorithms described herein may be implemented as hardware, electronic hardware, computer software, or combinations thereof. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

The title, background, brief description of the drawings, abstract, and drawings are hereby incorporated into the disclosure and are provided as illustrative examples of the disclosure, not as restrictive descriptions. It is submitted with the understanding that they will not be used to limit the scope or meaning of the claims. In addition, in the detailed description, it can be seen that the description provides illustrative examples and the various features are grouped together in various implementations for the purpose of streamlining the disclosure. The method of disclosure is not to be interpreted as reflecting an intention that the claimed subject matter requires more features than are expressly recited in each claim. Rather, as the claims reflect, inventive subject matter lies in less than all features of a single disclosed configuration or operation. The claims are hereby incorporated into the detailed description, with each claim standing on its own as a separately claimed subject matter.

The claims are not intended to be limited to the aspects described herein, but are to be accorded the full scope consistent with the language of the claims and to encompass all legal equivalents. Notwithstanding, none of the claims are intended to embrace subject matter that fails to satisfy the requirements of the applicable patent law, nor should they be interpreted in such a way.

What is claimed is:

1. A spring assembly for a vehicle tonneau cover, the spring assembly comprising:

multiple spring elements overlapping each other and configured to apply, to a stack of panels within a cartridge, a first force on a first side of the panels and a second force on a second side, opposite the first side, of the panels, the second force being greater than the first force.

2. The spring assembly of claim 1, wherein each of the multiple spring elements extends from an engagement end of the spring assembly that is configured to be coupled to a follower for supporting the panels within the cartridge.

3. The spring assembly of claim 1, further comprising a sliding end for sliding along a support plate and defining a first curve protruding in a first direction, wherein the multiple spring elements each define a second curve protruding in a second direction, opposite the first direction.

4. The spring assembly of claim 1, wherein the multiple spring elements comprise:

a first spring element having a first width; and a second spring element overlapping the first spring element along a second side of the spring assembly and having a second width that is smaller than the first width.

5. The spring assembly of claim 4, wherein;

the first spring element has a first length; and the second spring element has a second length that is shorter than the first length.

6. The spring assembly of claim 4, wherein the multiple spring elements further comprise a third spring element overlapping the first spring element and the second spring element along the second side of the spring assembly and having a third width that is smaller than the first width and the second width.

7. The spring assembly of claim 1, wherein:

one of the multiple spring elements defines a first thickness on a first side of the spring assembly; and the multiple spring elements define a second thickness, greater than the first thickness, on a second side of the spring assembly.

8. The spring assembly of claim 1, further comprising a roller at a sliding end of the spring assembly, the roller being configured to rotate about an axis.

9. A follower assembly for a vehicle cover system, the follower assembly comprising:

a follower comprising arms for supporting panels; and a spring assembly comprising:

an engagement end coupled to the follower;

multiple spring elements extending from the engagement end and overlapping each other;

a body forming a curve; and a sliding end, wherein the spring assembly is configured to bend at the engagement end as the follower urges the sliding end to slide along a support plate and until the curve of the body extends between the arms of the follower to directly engage the panels.

10. The follower assembly of claim 9, wherein:

the sliding end defines a first curve protruding in a first direction; and the body defines a second curve protruding in a second direction, opposite the first direction.

11. The follower assembly of claim 9, wherein the curve is a first curve protruding towards the follower and the body further comprises a second curve protruding towards the follower.

12. The follower assembly of claim 9, wherein the multiple spring elements are configured to apply, to the panels while within a cartridge, a first force on a first side of the panels and a second force on a second side, opposite the first side, of the panels, the second force being greater than the first force.

13. The follower assembly of claim 9, wherein the follower further comprises a beam joining the arms, wherein the engagement end of the spring assembly is coupled to the beam.

14. The follower assembly of claim 9, wherein the spring assembly further comprises a roller at the sliding end of the spring assembly, the roller being configured to rotate about an axis.

15. A follower assembly for a vehicle cover system, the follower assembly comprising:

a follower comprising arms extending in a first direction; and a spring assembly comprising:

an engagement end;

multiple spring elements extending from the engagement end and overlapping each other; and a body forming curves; and a mount coupling the engagement end of the spring assembly to the follower such that the body extends from the engagement end in a second direction, the second direction being is transverse to the first direction and towards the follower.

16. The follower assembly of claim 15, wherein the body of the spring assembly curves away from the second direction and away from the follower as it extends away from the mount.

17. The follower assembly of claim 15, wherein the body comprises:

a first body portion defining a first curve protruding towards the follower; and a second body portion defining a second curve protruding towards the follower.

18. The follower assembly of claim 17, wherein the spring assembly further comprises a sliding end, wherein the spring assembly is configured to bend at the engagement end as the follower urges the sliding end to slide along a support plate and until the first body portion and the second body portion extend between the arms of the follower.

19. The follower assembly of claim 18, wherein the sliding end defines a curve protruding away from the follower.

20. The follower assembly of claim 18, wherein the spring assembly further comprises a roller at the sliding end of the spring assembly, the roller being configured to rotate about an axis.

* * * * *